(12) United States Patent
Ohtani

(10) Patent No.: US 6,978,763 B2
(45) Date of Patent: Dec. 27, 2005

(54) ENGINE FUEL INJECTION DEVICE AND ENGINE FUEL INJECTION METHOD

(75) Inventor: Motoki Ohtani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/052,807

(22) Filed: Feb. 9, 2005

(65) Prior Publication Data

US 2005/0193983 A1    Sep. 8, 2005

(30) Foreign Application Priority Data

Mar. 3, 2004   (JP) .............................. 2004-059461

(51) Int. Cl.$^7$ ............................................. F02B 17/00
(52) U.S. Cl. ..................................... 123/430; 123/431
(58) Field of Search ................................ 123/430, 431

(56) References Cited

U.S. PATENT DOCUMENTS

| | | | |
|---|---|---|---|
| 6,659,071 B2 * | 12/2003 | LaPointe et al. | 123/299 |
| 6,684,852 B2 * | 2/2004 | Wright et al. | 123/431 |
| 6,715,464 B2 * | 4/2004 | Heimberg | 123/300 |
| 2002/0040692 A1 * | 4/2002 | LaPointe et al. | 123/27 GE |
| 2004/0149255 A1 * | 8/2004 | zur Loye et al. | 123/295 |
| 2005/0178360 A1 * | 8/2005 | Satou | 123/431 |

FOREIGN PATENT DOCUMENTS

| | | |
|---|---|---|
| JP | 2001-336439 | 12/2001 |
| JP | 2002-364409 | 12/2002 |

* cited by examiner

Primary Examiner—John T. Kwon
(74) Attorney, Agent, or Firm—Oliff & Berridge, PLC

(57) ABSTRACT

A fuel injection device for an engine includes a direct injector and an intake passage injector. When the engine load is relatively low, a fuel pressure lowering procedure is executed for lowering the pressure of fuel supplied to the direct injector. An ECU sets a fuel injection ratio, which is the ratio between the fuel injection amount of the direct injector and that of the intake passage injector, based on the engine operation state. The ECU changes the fuel injection ratio such that the ratio of the fuel injection amount of the direct injector to the total amount of the fuel fed to a combustion chamber is decreased, until the pressure of the fuel supplied to the direct injector is raised from the value lowered through the fuel pressure lowering procedure to a predetermined permissible value. This effectively suppresses hampering of the engine combustion, caused by the lowered fuel pressure.

15 Claims, 3 Drawing Sheets

ENGINE FUEL INJECTION DEVICE AND ENGINE FUEL INJECTION METHOD

FIELD OF THE INVENTION

The present invention relates to a fuel injection device and a fuel injection method for an internal combustion engine that has a direct injector injecting fuel directly into a combustion chamber and an intake passage injector injecting fuel into an intake passage.

BACKGROUND OF THE INVENTION

Conventionally, as described in Japanese Laid-Open Patent Publication No. 2002-364409, for example, a fuel injection device capable of switching fuel injection modes is known. More specifically, the fuel injection device is employed in an internal combustion engine having a direct injector injecting fuel directly into a combustion chamber and an intake passage injector injecting fuel into an intake passage. The fuel injection device switches the fuel injection modes through selective actuation of the direct injector or the intake passage injector.

Since the pressure in the combustion chamber is relatively high, the fuel injection pressure (the fuel pressure) of the direct injector, which injects fuel into the combustion chamber, is normally set to a relatively high level, as compared to that of the intake passage injector. In this manner, the direct injector injects the high-pressure fuel into the combustion chamber, such that vaporization of the fuel is promoted in the combustion chamber.

However, the fuel injection device may lead to the following problem. That is, when the fuel is pressurized to a relatively high level in a fuel pressurizing system for the direct injector, a noise may be produced by such operation in the fuel pressurizing system. To suppress the noise, a target pressure for the fuel pressurization may be lowered if the engine is idling. However, this may cause a delay in the fuel pressurization when the engine operation is switched from an idling state to, for example, a high-load state, at a later stage. In this case, the fuel is pressurized to only an insufficient level or cannot reach a level required for the high-load engine operation.

If the actual fuel pressure cannot achieve the required level, as described above, the fuel injected by the direct injector is not adequately atomized. This may hamper the fuel combustion, lowers the engine torque, and aggravates exhaust properties, in disadvantageous manners.

SUMMARY OF THE INVENTION

Accordingly, it is an objective of the present invention to provide a fuel injection device and a fuel injection method for an engine that has a direct injector and an intake passage injector, capable of effectively suppressing hampering of engine combustion, regardless of lowered fuel pressure.

To achieve the foregoing and other objectives and in accordance with the purpose of the present invention, the invention provides a fuel injection device for an internal combustion engine having a combustion chamber and an intake passage connected to the combustion chamber. The device includes a direct injector for injecting fuel directly into the combustion chamber, an intake passage injector for injecting fuel into the intake passage, and a fuel pressurization system for supplying pressurized fuel to the direct injector. The fuel pressurization system executes a fuel pressure lowering procedure for lowering the pressure of the fuel supplied to the direct injector when the engine load is relatively low. The device further includes a setting section for setting a fuel injection ratio, which is the ratio between the fuel injection amount of the direct injector and that of the intake passage injector, based on the operation state of the engine. Until the pressure of the fuel supplied from the fuel pressurization system to the direct injector is raised from the value lowered through the fuel pressure lowering procedure to a predetermined permissible value, the setting section changes the fuel injection ratio such that the ratio of the fuel injection amount of the direct injector to the total amount of the fuel fed to the combustion chamber is decreased.

In the another aspect of the present invention, until a predetermined time elapses after a target value of the engine load is raised during or after the execution of the fuel pressure lowering procedure, the setting section may change the fuel injection ratio such that the ratio of the fuel injection amount of the direct injector to the total amount of the fuel fed to the combustion chamber is decreased.

The present invention also provides a fuel injection method for an internal combustion engine. The engine has a direct injector for injecting fuel directly into a combustion chamber of the engine, and an intake passage injector for injecting fuel into an intake passage connected to the combustion chamber. The method comprising: supplying pressurized fuel to the direct injector, a fuel pressure lowering procedure being executed for lowering the pressure of the fuel supplied to the direct injector when the engine load is relatively low; setting a fuel injection ratio based on the operation state of the engine, the fuel injection ratio being the ratio between the fuel injection amount of the direct injector and that of the intake passage injector; and changing the fuel injection ratio such that the ratio of the fuel injection amount of the direct injector to the total amount of the fuel fed to the combustion chamber is decreased, until the pressure of the fuel supplied to the direct injector is raised from the value lowered through the fuel pressure lowering procedure to a predetermined permissible value.

In the another aspect of the present invention, instead of the step of changing the fuel injection ratio as recited above, the method includes: changing the fuel injection ratio such that the ratio of the fuel injection amount of the direct injector to the total amount of the fuel fed to the combustion chamber is decreased, until a predetermined time elapses after a target value of the engine load is raised during or after the execution of the fuel pressure lowering procedure.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A fuel injection device according to an embodiment of the present invention will now be described.

Figure 1:
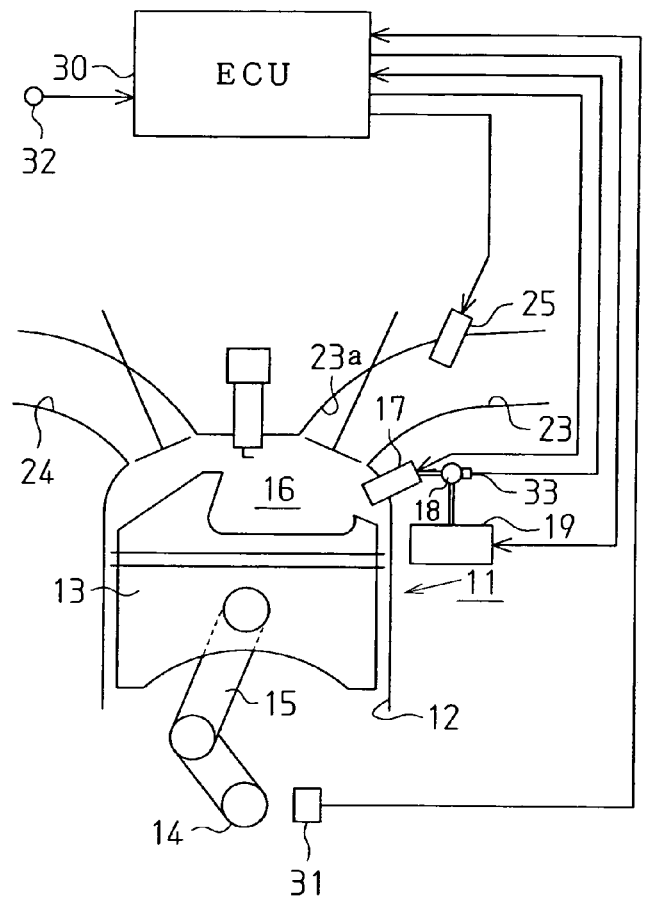
FIG. 1 is a block diagram schematically showing the structure of a fuel injection device for an engine according to an embodiment of the present invention.

Referring to FIG. 1, the fuel injection device is applied to an internal combustion engine 11 mounted on a vehicle. The engine 11 has a piston 13 received in a cylinder 12. The piston 13 is connected to a crankshaft 14 through a connecting rod 15, which converts reciprocation of the piston 13 to rotation of the crankshaft 14.

A combustion chamber 16 is defined in the cylinder 12 at a position above the piston 13. A direct injector 17 is provided to be exposed to the combustion chamber 16 for injecting fuel directly into the combustion chamber 16. The direct injector 17 is connected to a fuel pressurizing system configured as follows. That is, a delivery pipe 18 is connected to the direct injector 17. A supply pump 19 is connected to the delivery pipe 18 and pressurizes fuel from a fuel tank (not shown) to a relatively high level. The fuel pressurized by the supply pump 19 is supplied to the delivery pipe 18. The fuel injection pressure of the direct injector 17 is set in correspondence with the pressure of the fuel in the delivery pipe 18. The fuel is injected into the combustion chamber 16 when a valve of the direct injector 17 is actuated to an open position.

The combustion chamber 16 is communicated with an intake passage 23 and an exhaust passage 24. The joint between the combustion chamber 16 and the intake passage 23 forms an intake port 23a. An intake passage injector 25 is provided to be exposed to the intake passage 23. The intake passage injector 25 injects fuel into the intake passage 23 toward the intake port 23a. The intake passage injector 25 is supplied with high-pressure fuel through a known fuel supply mechanism (not shown). The fuel is injected toward the intake port 23a when a valve of the intake passage injector 25 is actuated to an open position.

The fuel injection device includes an electronic control unit (ECU) 30 for controlling actuation of the direct injector 17 and the intake passage injector 25 and various sensors used in such operation.

The sensors include, for example, an engine speed sensor 31 for detecting the rotation speed of the crankshaft 14 (an engine speed NE) and an accelerator pedal sensor 32 for detecting the depression amount of an accelerator pedal (not shown). Similarly, a fuel pressure sensor 33 is provided in the delivery pipe 18 for detecting the fuel pressure in the delivery pipe 18 (an actual fuel pressure P). The sensors each send a detection signal to the ECU 30.

Based on the detection signals from the sensors, the ECU 30 detects an engine operation state and switches fuel injection modes based on the detected engine operation state. More specifically, depending on the engine operation state, the ECU 30 actuates at least one of the direct injector 17 and the intake passage injector 25 and determines the fuel injection timing and the fuel injection amount that are set in correspondence with the fuel injection modes. The ratio of the fuel injection amount of the direct injector 17 to that of the intake passage injector 25 (the fuel injection ratio) is set to a value corresponding to the current engine operation state. In the illustrated embodiment, the ECU 30 functions as a setting section for setting the fuel injection ratio for the direct injector 17 and the intake passage injector 25 depending on the engine operation state.

The ECU 30 also controls the fuel pressure in the delivery pipe 18 based on a detection signal from the fuel pressure sensor 33. More specifically, the ECU 30 first calculates a target value for the fuel pressure in the delivery pipe 18 (a target fuel pressure TP) based on the current engine operation state. The target fuel pressure TP is then compared with the actual fuel pressure P. Based on the comparison, the ECU 30 adjusts the amount of fuel fed from the supply pump 19, or the degree of fuel pressurization in the supply pump 19, such that the actual fuel pressure P corresponds to the target fuel pressure TP. Through this adjustment, the fuel pressure in the delivery pipe 18, or the fuel injection pressure of the direct injector 17, is controlled to a level corresponding to the engine operation state.

Figure 2:
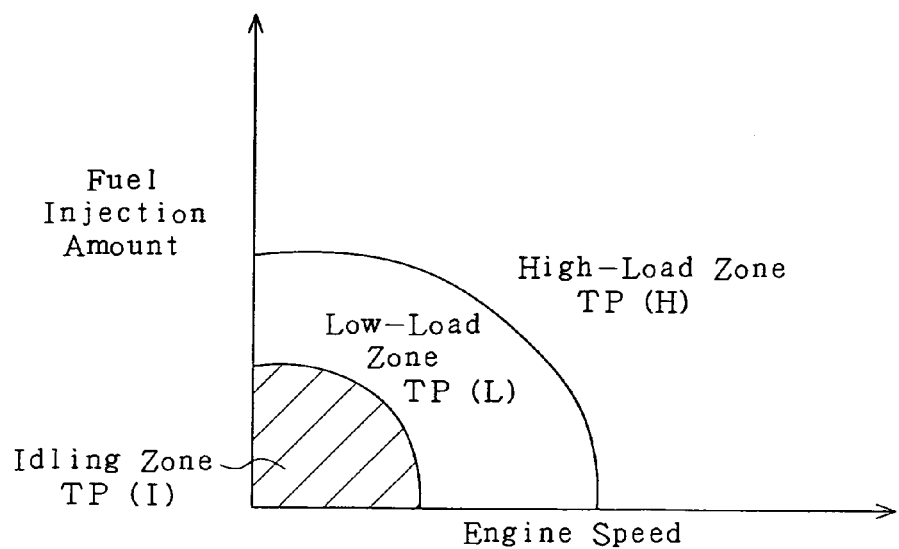
FIG. 2 is a diagram schematically indicating the structure of a fuel pressure control map used in a fuel pressure lowering procedure.

The target fuel pressure TP is obtained from a test as a predetermined value that is optimal to the current engine operation state. The function data for defining the relationship between the target fuel pressure TP and the engine operation state (the engine speed NE and the fuel injection amount) is stored as a fuel pressure control map (see FIG. 2) in a ROM (not shown) or the like provided in the ECU 30. The ECU 30 refers to the map when computing the target fuel pressure TP.

As aforementioned, since the direct injector 17 injects fuel directly into the combustion chamber 16, the fuel injection pressure of the direct injector 17 is set to an extremely high level as compared to that of the intake passage injector 25. Therefore, when the direct injector 17 is actuated, an uncomfortable, mechanical noise, such as operational noises caused by the valves incorporated in the supply pump 19 and the valve of the direct injector 17, may be produced due to pressurization of fuel.

More specifically, when the engine operation state corresponds to a high-speed and high-load zone, the fuel pressure in the delivery pipe 18 is adjusted to a maximum target fuel pressure TP(H) (for example, approximately 10 to 12 MPa). In contrast, if the engine 11 is operated in a sate corresponding to a low-speed and low-load zone, the fuel pressure in the delivery pipe 18 is adjusted to a relatively low target fuel pressure TP(L) (for example, approximately 4 MPa). Accordingly, the noise caused by the fuel pressurization is relatively loud when the engine operation state corresponds to the high-speed and high-load zone, as compared to the low-speed and low-load zone. However, in the high-speed and high-load zone of engine operation, other noises caused by engine combustion and vehicle movement may mask the noise caused by the fuel pressurization, making this noise nearly inaudible. In contrast, since the noises caused by the engine combustion and the vehicle movement are relatively small when the engine 11 is operated in a state corresponding to the low-speed and low-load zone, the noise caused by the fuel pressurization may become audible, which may be uncomfortable to the driver. As a result, the noise caused by the fuel pressurization leads to a problem when the engine 11 is operated in the low-speed and low-load zone, or, particularly, in an idling zone.

Accordingly, in the illustrated embodiment, the idling zone, for example, is defined as a noise production zone. Thus, if the engine operation state corresponds to the idling zone, the fuel pressure in the delivery pipe 18 is adjusted to a target fuel pressure TP(I) (for example, approximately 2 MPa) that is lower than the aforementioned target fuel pressure TP(L) for the low-speed and low-load zone of the engine operation. In other words, when the engine 11 is operated in the idling zone (as indicated by the area marked by diagonal lines in FIG. 2), it is determined that the engine operation state corresponds to the noise production zone. Therefore, a procedure for lowering the fuel pressure in the delivery pipe 18 to the aforementioned target fuel pressure TP(I) (a fuel pressure lowering procedure) is carried out.

The noise caused by the fuel pressurization is thus suppressed by means of the fuel pressure lowering procedure.

However, the fuel pressure lowering procedure may lead to the following problem.

That is, during execution of the fuel pressure lowering procedure or immediately after completion of such procedure, if the engine operation state is changed due to, for example, depression of the accelerator pedal, a target control value of the engine load (a target engine load) will be increased. If this is the case, the fuel pressure lowering procedure will be suspended if the procedure is still in execution, for increasing the fuel pressure. However, in this case, it takes a relatively long time for the actual fuel pressure P to reach the target fuel pressure TP. Also, even after the completion of the fuel pressure lowering procedure, it is highly likely that the actual fuel pressure P remains lower than the target fuel pressure TP. Accordingly, when the fuel is injected by the direct injector 17, the fuel pressure in the delivery pipe 18 is not yet sufficiently high. As a result, vaporization of the injected fuel is maintained in a non-promoted state, which may hamper the combustion of the fuel.

To solve this problem, in the illustrated embodiment, the aforementioned fuel injection ratio is changed such that the ratio of the fuel injection amount of the direct injector 17 to the total amount of fuel supplied to the combustion chamber 16 is decreased.

Hereinafter, a procedure for changing the fuel injection ratio will be explained with reference to the flowchart of FIG. 3.

The flowchart schematically indicates the fuel injection ratio changing procedure, which is executed by the ECU 30 at predetermined time intervals.

Figure 3:
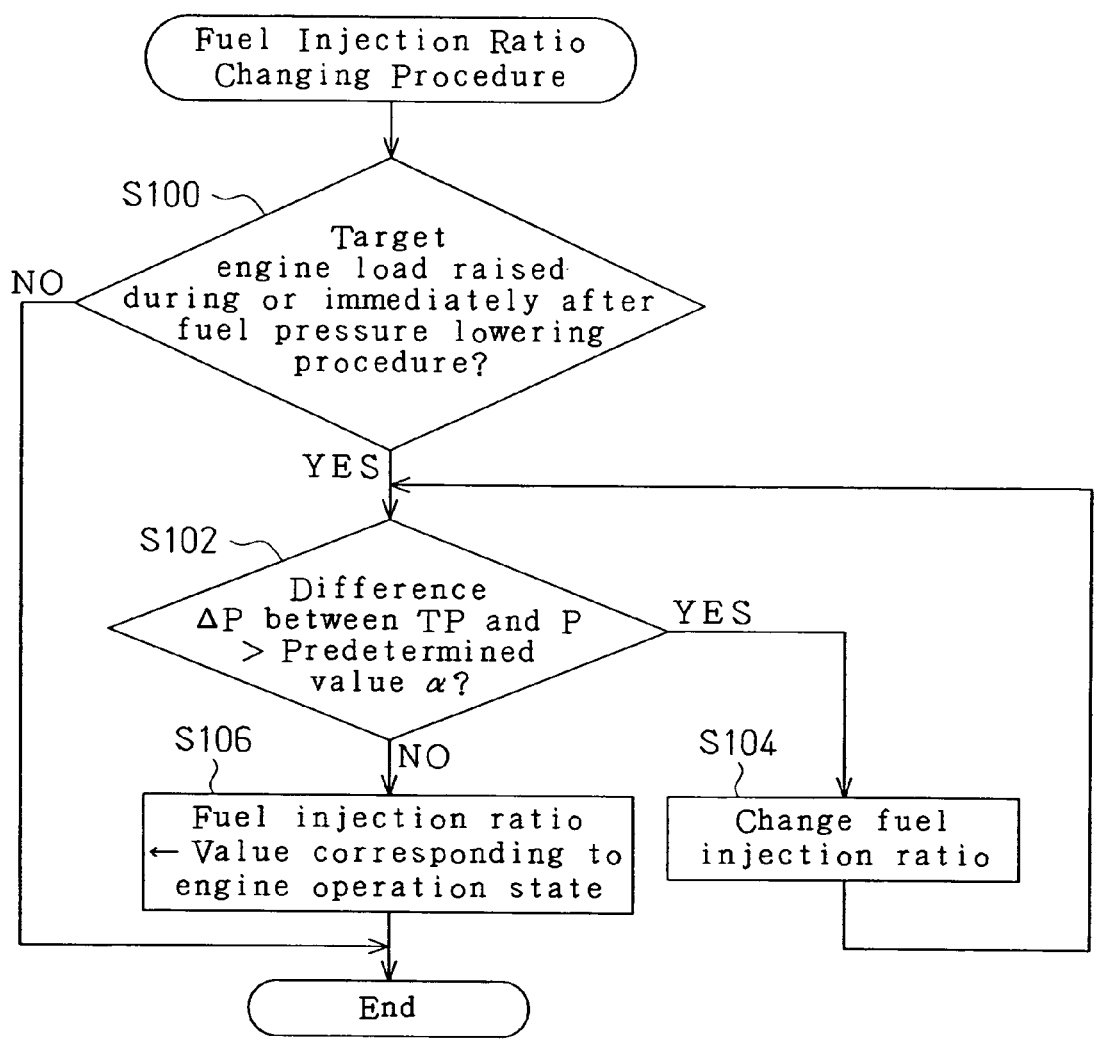
FIG. 3 is a flowchart specifically showing a fuel injection ratio changing procedure.

As indicated by FIG. 3, the ECU 30 first determines whether or not the target engine load has been raised during execution of the fuel pressure lowering procedure or immediately after completion of the fuel pressure lowering procedure (in step S100). More specifically, the ECU 30 determines that the target engine load has been raised if the accelerator pedal has been depressed.

If determining that the engine load has been raised (step S100: YES), the ECU 30 computes a difference $\Delta P$ ($=TP-P$) between the target fuel pressure TP and the actual fuel pressure P. Then, the ECU 30 determines whether or not the obtained value $\Delta P$ is greater than a predetermined value $\alpha$ (in step S102). In other wards, the ECU 30 determines whether the actual fuel pressure P is below a permissible value that is less than the target fuel pressure TP by an amount corresponding to the predetermined value $\alpha$.

If the determination is positive (step S102: YES), it is indicated that the actual fuel pressure P is lower than the target fuel pressure TP by a relatively large margin and the engine combustion is thus likely to be hampered. Accordingly, the ECU 30 changes the fuel injection ratio such that the ratio of the fuel injection amount of the direct injector 17 to the total amount of fuel supplied to the combustion chamber 16 is decreased (in step S104). That is, since the operation of the intake passage injector 25 is unaffected by the fuel pressure in the delivery pipe 18, the ratio of the fuel injection amount of the direct injector 17 to the total amount of fuel supplied to the combustion chamber 16 is decreased, thus enabling the intake passage injector 25 to be operated positively with respect to the direct injector 17. This suppresses the noise production when the engine load is relatively low, or the engine is idling. Further, hampering of the engine combustion by a reduced fuel pressure is also suppressed. The predetermined value a is obtained from a test as a value at which it is determined with high accuracy that the actual fuel pressure P is low sufficiently for hampering the engine combustion. The value $\alpha$ is stored in the ECU 30.

More particularly, the fuel injection ratio is changed in the following manner.

If the direct injector 17 and the intake passage injector 25 are both in operation when changing of the fuel injection ratio becomes necessary, the proportion corresponding to the direct injector 17 is decreased and that corresponding to the intake passage injector 25 is increased, until the engine combustion is improved. If only the direct injector 17 is in operation when the changing of the fuel injection ratio becomes necessary, operation of the intake passage injector 25 is started, and the proportion corresponding to the direct injector 17 is decreased until the engine combustion is improved. Further, in either case, the fuel injection ratio can be set such that the operation of the direct injector 17 is suspended if, for example, the fuel pressure in the delivery pipe 18 is extremely low. Also, since hampering of the engine combustion becomes more likely to happen as the aforementioned difference $\Delta P$ becomes greater, the fuel injection ratio is changed such that the proportion corresponding to the direct injector 17 becomes smaller as the difference $\Delta P$ becomes greater, in the illustrated embodiment. In this manner, the hampering of the engine combustion is reliably suppressed.

Afterwards, the operations corresponding to steps S102 and S104 are repeatedly performed until the difference $\Delta P$ becomes equal to or smaller than the value $\alpha$. When the difference $\Delta P$ becomes equal to or smaller than the value a (step S102: NO), the ECU 30 sets the fuel injection ratio to restore a normal proportion for the direct injector 17, or to restore the fuel injection ratio corresponding to the engine operation state (in step S106). The procedure is then suspended.

In contrast, when the fuel pressure lowering procedure is not performed or a relatively long time has elapsed since suspension of the procedure, or if the target engine load remains non-increased (step S100: NO), the engine operation is continued without changing the fuel injection ratio, or without switching the fuel injection modes. In other words, in these cases, the effective engine combustion is maintained.

As has been described, the illustrated embodiment has the following advantages.

(1) Unless the difference $\Delta P$ between the target fuel pressure TP and the actual fuel pressure P becomes equal to or smaller than the value $\alpha$, the fuel injection ratio of the direct injector 17 to the intake passage injector 25 is changed to a value smaller than the value corresponding to the engine operation state. Thus, the fuel injection amount of the intake passage injector 25, which is unaffected by the fuel pressure in the delivery pipe 18, is increased. This suppresses hampering of the engine combustion, as well as aggravation of the exhaust properties, otherwise caused by non-promoted vaporization of the fuel injected by the direct injector 17.

(2) The noise production when the engine load is relatively low, or, for example, the engine is idling, is suppressed. Also, hampering of the engine combustion is effectively stopped from happening.

(3) The fuel injection ratio is changed in a state where the target engine load has been raised during execution of the fuel pressure lowering procedure or after completion of the fuel pressure lowering procedure. Therefore, even if it is highly likely that the actual fuel pressure P is lower than the target fuel pressure TP and the fuel injection pressure of the direct injector 17 is extremely low, the engine combustion is prevented from being hampered by these factors.

(4) The determination that the target engine load has been raised is based on the fact that the accelerator pedal has been depressed. Such determination is thus made relatively quickly, allowing the fuel injection ratio to be changed immediately when necessary.

The illustrated embodiment may be modified as follows.

Instead of the accelerator pedal, an accelerator lever may be employed as an accelerator manipulating portion. If this is the case, it is determined in step S100 that the target engine load has been raised if the accelerator manipulating portion is manipulated in a manner increasing the engine load.

Figure 4:
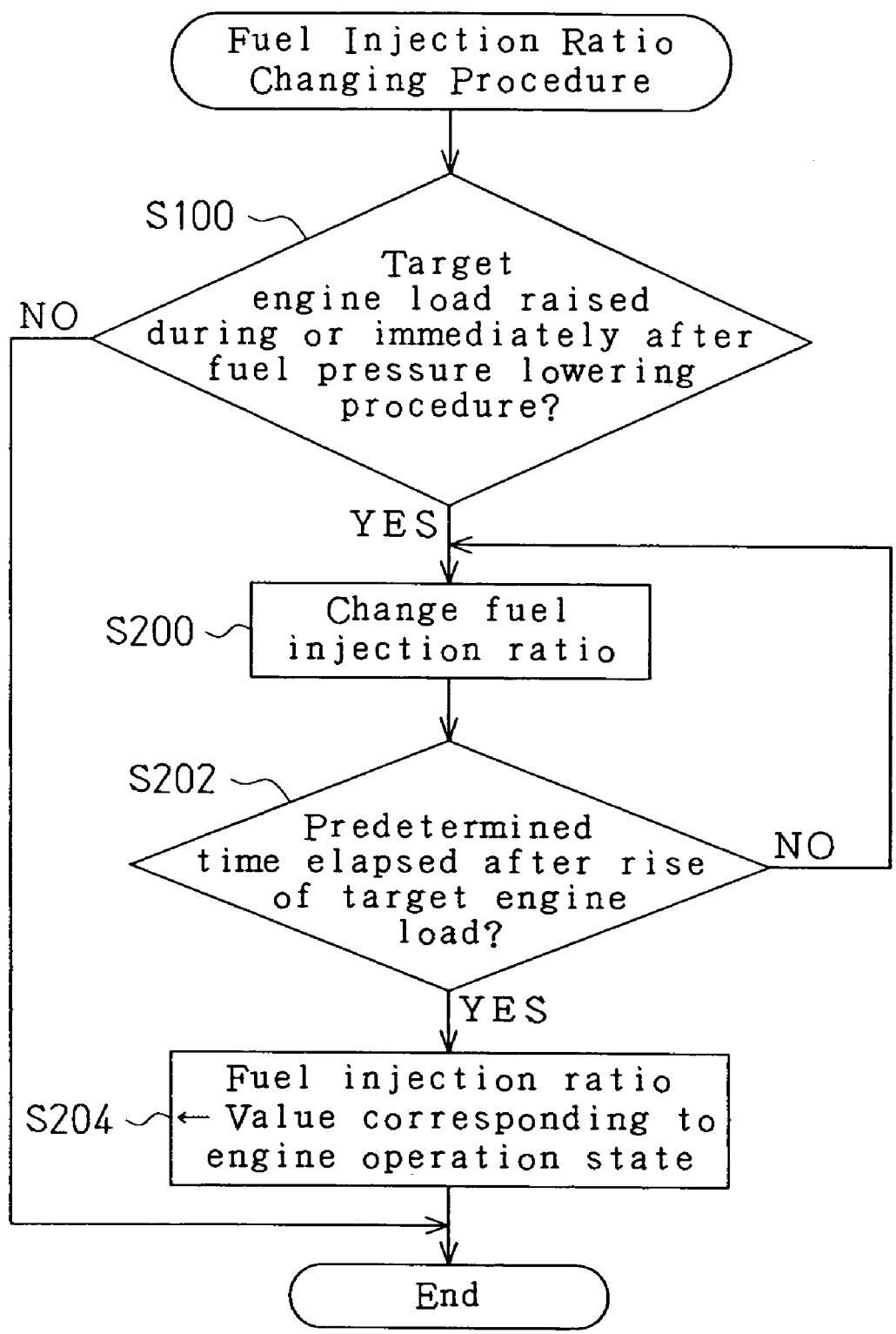
FIG. 4 is a flowchart specifically showing a modification of the procedure of FIG. 3.

As illustrated in FIG. 4, the step of changing the fuel injection ratio for decreasing the proportion corresponding to the direct injector 17 (step S200) may be continued until a predetermined time elapses after the target engine load is raised (step S202: YES). Afterwards, the fuel injection ratio is returned to the value corresponding to the engine operation state (in step S204). Also in this case, the changed fuel injection ratio is returned to the value corresponding to the engine operation state after the actual fuel pressure P reaches the target fuel pressure P, or, the promoted vaporization of the fuel injected by the direct injector 17 is achieved. The hampering of the engine combustion is thus suppressed.

The determination that the target engine load has been raised may be based on the fact that the crankshaft 14 has been connected to an axle (not shown) and the braking force applied to the vehicle is equal to or smaller than a predetermined value. This makes it possible to determine that the target engine load has been raised as presumed with a certain level of probability. The fuel injection ratio is thus quickly changed when needed. The determination that the crankshaft 14 is connected to the axle (a power transmitting system) may be based on conditions including that the automatic transmission is placed in the D range or the like or that a clutch mechanism for selectively connecting or disconnecting the crankshaft 14 with respect to the axle is held in a connected state. Also, the determination that the breaking force applied to the vehicle is equal or smaller than the predetermined value may be based on conditions including that a brake manipulator is held in a non-manipulated state or that the manipulation amount of the brake manipulator is less than a predetermined level.

The fuel injection ratio may be maintained as a changed value smaller than the value corresponding to the engine operation state such that the proportion corresponding to the direct injector 17 is decreased, until the actual fuel pressure P rises to a predetermined fixed value as a permissible valve. Also in this case, the changed injection ratio is returned to the ratio corresponding to the engine operation state after the fuel pressure in the delivery pipe 18 becomes sufficiently high.

Other than engines in which the intake passage injector is installed in the intake passage, the present invention may be applied to engines in which the intake passage injector is installed as a so-called cold start injector in a surge tank (not shown) provided in the intake passage.

The present examples and embodiments are to be considered as illustrative and not restrictive and the invention is not to be limited to the details given herein, but may be modified within the scope and equivalence of the appended claims.

What is claimed is:

1. A fuel injection device for an internal combustion engine having a combustion chamber and an intake passage connected to the combustion chamber, the device comprising:
   a direct injector for injecting fuel directly into the combustion chamber;
   an intake passage injector for injecting fuel into the intake passage;
   a fuel pressurization system for supplying pressurized fuel to the direct injector, the fuel pressurization system executing a fuel pressure lowering procedure for lowering the pressure of the fuel supplied to the direct injector when the engine load is relatively low; and
   a setting section for setting a fuel injection ratio based on the operation state of the engine, the fuel injection ratio being the ratio between the fuel injection amount of the direct injector and that of the intake passage injector, wherein, until the pressure of the fuel supplied from the fuel pressurization system to the direct injector is raised from the value lowered through the fuel pressure lowering procedure to a predetermined permissible value, the setting section changes the fuel injection ratio such that the ratio of the fuel injection amount of the direct injector to the total amount of the fuel fed to the combustion chamber is decreased.

2. The device according to claim 1, wherein the setting section changes the fuel injection ratio based on the pressure of the fuel supplied to the direct injector, in a state where the condition that a target value of the engine load has been raised during or after the execution of the fuel pressure lowering procedure.

3. The device according to claim 2, wherein the engine is provided in a vehicle having an accelerator manipulating portion, and wherein the setting section determines whether or not the target value of the engine load has been raised depending on manipulation of the accelerator manipulating portion.

4. The device according to claim 2, wherein the engine is provided in a vehicle having a power transmitting system, and wherein the setting section determines whether or not the target value of the engine load has been raised depending on the connection state of the engine with respect to the power transmitting system and braking force applied to the vehicle.

5. The device according to claim 4, wherein the setting section determines that the target value of the engine load has been raised if the engine is connected to the power transmitting system and the braking force is not greater than a predetermined value.

6. The device according to claim 2, wherein, if the target value of the engine load has been raised, the fuel pressurization system raises the lowered fuel pressure to a target value that is determined based on the target value of the engine load.

7. The device according to claim 6, wherein the permissible value is smaller than the target value of the fuel pressure by an amount corresponding to a predetermined value.

8. The device according to claim 1, wherein the permissible value is a fixed value.

9. The device according to claim 1, wherein the setting section operates such that the ratio of the fuel injection amount of the direct injector to the total amount of the fuel fed to the combustion chamber becomes smaller as the fuel pressure becomes lower relative to the permissible value.

10. A fuel injection device for an internal combustion engine having a combustion chamber and an intake passage connected to the combustion chamber, the device comprising:
- a direct injector for injecting fuel directly into the combustion chamber;
- an intake passage injector for injecting fuel into the intake passage;
- a fuel pressurization system for supplying pressurized fuel to the direct injector, the fuel pressurization system executing a fuel pressure lowering procedure for lowering the pressure of the fuel supplied to the direct injector when the engine load is relatively low; and
- a setting section for setting a fuel injection ratio based on the operation state of the engine, the fuel injection ratio being the ratio between the fuel injection amount of the direct injector and that of the intake passage injector, wherein, until a predetermined time elapses after a target value of the engine load is raised during or after the execution of the fuel pressure lowering procedure, the setting section changes the fuel injection ratio such that the ratio of the fuel injection amount of the direct injector to the total amount of the fuel fed to the combustion chamber is decreased.

11. The device according to claim 10, wherein the engine is provided in a vehicle having an accelerator manipulating portion, and wherein the setting section determines whether or not the target value of the engine load has been raised depending on manipulation of the accelerator manipulating portion.

12. The device according to claim 10, wherein the engine is provided in a vehicle having a power transmitting system, and wherein the setting section determines whether or not the target value of the engine load has been raised depending on the connection state of the engine with respect to the power transmitting system and braking force applied to the vehicle.

13. The device according to claim 12, wherein the setting section determines that the target value of the engine load has been raised if the engine is connected to the power transmitting system and the braking force is not greater than a predetermined value.

14. A fuel injection method for an internal combustion engine, the engine having a direct injector for injecting fuel directly into a combustion chamber of the engine, and an intake passage injector for injecting fuel into an intake passage connected to the combustion chamber, the method comprising:
- supplying pressurized fuel to the direct injector, a fuel pressure lowering procedure being executed for lowering the pressure of the fuel supplied to the direct injector when the engine load is relatively low;
- setting a fuel injection ratio based on the operation state of the engine, the fuel injection ratio being the ratio between the fuel injection amount of the direct injector and that of the intake passage injector; and
- changing the fuel injection ratio such that the ratio of the fuel injection amount of the direct injector to the total amount of the fuel fed to the combustion chamber is decreased, until the pressure of the fuel supplied to the direct injector is raised from the value lowered through the fuel pressure lowering procedure to a predetermined permissible value.

15. A fuel injection method for an internal combustion engine, the engine having a direct injector for injecting fuel directly into a combustion chamber of the engine and an intake passage injector for injecting fuel into an intake passage connected to the combustion chamber, the method comprising:
- supplying pressurized fuel to the direct injector, a fuel pressure lowering procedure being executed for lowering the pressure of the fuel supplied to the direct injector when the engine load is relatively low;
- setting a fuel injection ratio based on the operation state of the engine, the fuel injection ratio being the ratio between the fuel injection amount of the direct injector and that of the intake passage injector; and
- changing the fuel injection ratio such that the ratio of the fuel injection amount of the direct injector to the total amount of the fuel fed to the combustion chamber is decreased, until a predetermined time elapses after a target value of the engine load is raised during or after the execution of the fuel pressure lowering procedure.

* * * * *